United States Patent Office 3,433,199
Patented Mar. 18, 1969

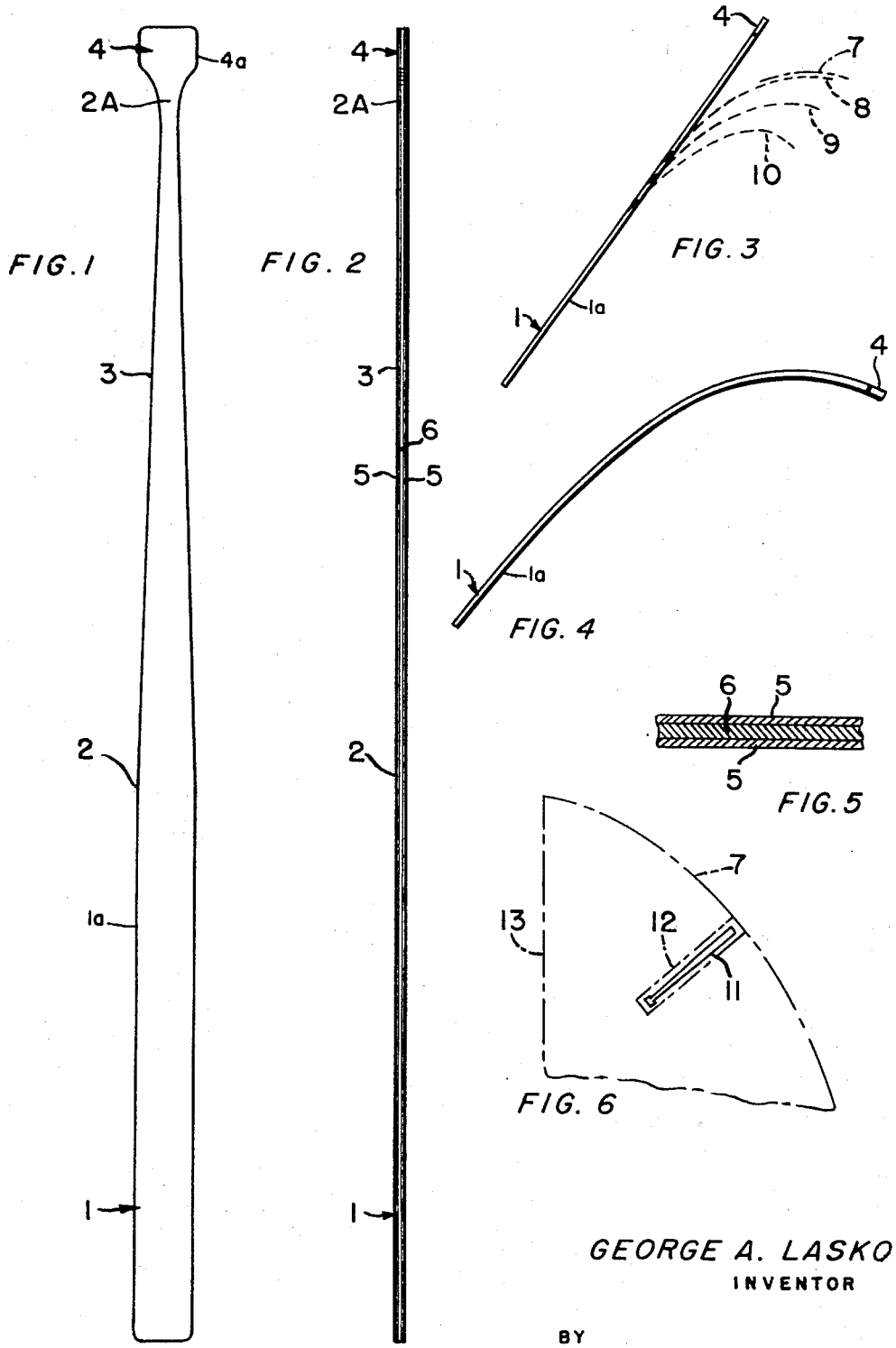

3,433,199
BATTEN FOR SAILS
George A. Lasko, El Cajon, Calif., assignor to Woolsey Marine Industries, Inc., New York, N.Y., a corporation
Filed Dec. 28, 1967, Ser. No. 695,317
U.S. Cl. 114—102     2 Claims
Int. Cl. B63h 9/08

ABSTRACT OF THE DISCLOSURE

A laminated sail batten of specified shape for use with all types of sailboats. The batten has major and minor parallel edges with a tapered connecting portion and is of uniform thickness.

Background of the invention

This invention pertains to an improved laminated batten. It embodies an evolvement of body shape and structure.

Heretofore I jointly invented a batten formed of a section of wood laminated between two plastic sections. That batten is disclosed in United States Patent No. 3,168,068. That patent teaches the advancement in the art from solid wood battens to laminated battens. My present invention includes the laminations in the wood portion of that earlier invention. Therefore, the description of the materials and formation of laminated battens will not be repeated herein. Reference may be had to said patent for a description thereof.

Summary

My present invention is a novel batten which assumes the desired parabolic curve shape when in use. However, because of its novel shape this result is accomplished without deleting the wood core in any portion of the batten. Presence of the wood core is desired. It helps give strength to the device.

Also, by avoiding a variance in the thickness of the batten, I now am able to save significant time, effort and expense in its manufacture. My novel battens are now made from laminated sheets of uniform content and thickness throughout.

Brief description of the drawing

In the drawing showing preferred embodiments of my invention wherein like numerals indicate like parts throughout:

FIGURE 1 is a perspective view of the side of my novel batten.

FIGURE 2 is a view of the edge thereof.

FIGURE 3 is a view of the edge thereof showing its capabilities for bending.

FIGURE 4 is a view of the edge thereof a different configuration on bending to show the versatility of its flexibility.

FIGURE 5 is a cross-section view of the edge thereof.

FIGURE 6 is a side view showing the position of the device in the sail, not to scale.

Description of preferred embodiments

Referring to the drawing forming a part hereof, the numeral 1 indicates that major parallel portion of the novel batten which has parallel edges 1a. Such portion begins at one end thereof and extends for about one half the overall length thereof, to the point marked by the numeral 2.

Beginning at the opposite end of the batten a relatively short parallel portion 4 is provided. It similarly has parallel edges. Its width is comparable to that of the first mentioned portion. However its length is only about one fifteenth that of major parallel portion 1.

Between the two parallel portions 1 and 4, and integral therewith, is a tapering portion 3. Its width uniformly changes from that of portion 1 at point 2 to approximately one-half thereof at the integral connecting portion 2A where it integrates with portion 4.

Throughout the batten wood core 6, best seen in FIGURE 5, is laminated between strips of plastic 5 all of uniform construction throughout the entire structure.

Because of this formation, when the batten 11 is positioned in conventional pocket 12 of said 7 on mast 13, its curvature is such, at all times, that optimum advantage of the wind results.

Referring to FIGURE 3, it may be seen that desired contact with sail 7 is maintained regardless of the force and direction of the wind. Especially the tapered portion 3 bends in example positions 8, 9, and 10 as illustrative of varying sailing conditions.

An additional feature of the novel device lies in the fact that the shape of element 4 permits it to serve as a guide for the batten 11 in pocket 12, allowing the batten to center itself for maximum performance in the pocket provided.

It is to be understood that the construction of my invention, herein shown and described, is to be taken as a preferred example of the same, and that various changes in size and materials may be resorted to, without departing from the spirit of my invention.

I claim:
1. A batten for sails, said batten having parallel sides extending the entire length thereof comprising, in combination:
   (a) a major parallel portion having substantially parallel edges and extending from one end of said batten to about one-half of the entire length of the batten,
   (b) a minor parallel portion having substantially parallel edges and extending from the other end of said batten,
   (c) a tapered portion located between the major and minor parallel portions and having a pair of edges uniformly converging from the major parallel portion to a width between said converging edges of about one-half the width of the said major parallel portion, and
   (d) an integral connecting portion located between said tapered portion and said major parallel portion and having edges which connect the ends of the converging edges to the parallel sides of said minor parallel portion.
2. A batten for sails as defined in claim 1 wherein: said batten has a laminated structure across the thickness dimension thereof and along the entire length of the said batten.

References Cited

UNITED STATES PATENTS 2,608,172   8/1952   Biuw _____ 114—103
3,168,068   2/1965   Lasko et al. _____ 114—102

TRYGVE M. BLIX, *Primary Examiner.*